United States Patent [19]

Kim et al.

[11] Patent Number: 4,612,183

[45] Date of Patent: * Sep. 16, 1986

[54] METHOD OF PRODUCING CRYSTALLINE AMMONIUM METATUNGSTATE

[75] Inventors: Tai K. Kim, Towanda; Carl W. Boyer, Wyalusing; Martin B. MacInnis; Donald H. Ennis, both of Towanda, all of Pa.

[73] Assignee: GTE Products Corporation, Stamford, Conn.

[*] Notice: The portion of the term of this patent subsequent to Jul. 1, 2003 has been disclaimed.

[21] Appl. No.: 704,992

[22] Filed: Feb. 25, 1985

[51] Int. Cl.$^4$ .............................................. C01G 41/00
[52] U.S. Cl. ..................................................... 423/593
[58] Field of Search ........................................... 423/593

[56] References Cited

U.S. PATENT DOCUMENTS

| | | | |
|---|---|---|---|
| 3,175,881 | 3/1965 | Chiola et al. | 502/200 |
| 3,956,474 | 5/1976 | Ritsko | 423/593 |
| 4,504,461 | 3/1985 | Carpenter et al. | 423/593 |

Primary Examiner—John Doll
Assistant Examiner—Wayne A. Langel
Attorney, Agent, or Firm—Donald R. Castle; L. Rita Quatrini

[57] ABSTRACT

A method is disclosed for producing crystalline ammonium metatungstate from ammonium paratungstate. The method involves heating ammonium paratungstate in a multiple hearth furnace at from about 200° C. to about 400° C. to form a relatively uniformly heated ammonium paratungstate. A slurry of the heated ammonium paratungstate in water is then digested at from about 70° C. to about 100° C. for less than about 6 hours at relatively constant volume while maintaining the pH of the slurry at from about 4.2 to about 3.0 by the addition of ammonia as necessary to form a solution of ammonium metatungstate. The resulting ammonium metatungstate solution is then evaporated to a fraction of its original volume to concentrate it and any insolubles are removed. The ammonium metatungstate is then crystallized from the concentrated solution.

3 Claims, No Drawings

METHOD OF PRODUCING CRYSTALLINE AMMONIUM METATUNGSTATE

FIELD OF THE INVENTION

This invention relates to an improved method for producing ammonium metatungstate. More particularly, it relates to a method for producing ammonium metatungstate in crystalline form using ammonium paratungstate as the starting material.

BACKGROUND OF THE INVENTION

Tungsten, generally in the form of tungsten oxide, $WO_3$, is useful as a component of a variety of catalysts for chemical reactions. In most cases in the manufacture of these catalysts it is necessary at some stage to provide a water soluble tungsten compound from which the tungsten oxide is derived. For example, certain types of catalysts comprise porous carriers such as, for example, alumina impregnated with compounds of catalytic elements such as tungsten. In the preparation of such catalysts the carrier materials are immersed, or slurried, in solutions of the compounds of the catalyst compound intimately associated with the carrier. Ammonium metatungstate, $(NH_4)_6H_2W_{12}O_{40}\cdot xH_2O$ is a particularly useful solute in such solutions. It offers the advantage of being readily soluble in water and, in addition, it decomposes readily on heating to leave the desired catalytic residue of tungsten oxide in the carrier. Alakli metal salts of the tungstates are also water soluble, but their use in catalyst manufacture is restricted by the fact that the presence of residual alkali metals freguently is objectionable in catalytic materials.

It has been proposed to obtain ammonium metatungstate solutions by baking crystalline ammonium paratungstate at temperatures of the order of 500° F. to drive off ammonia and to then dissolve the product of the baking operation in water. As is well known, a certain amount of ammonium metatungstate is produced by such a baking operation. However, thermogravimetric studies of this process have demonstrated that the ammonium paratungstate is not converted entirely to ammonium metatungstate at any particular temperature, nor after any particular baking time. To the contrary, other degradation products, particularly insoluble tungsten oxide also are continuously formed during the baking. In addition, certain amounts of unconverted ammonium paratungstate remain. As a result, substantial amounts of insoluble tungsten oxide and also ammonium paratungstate, which is only slightly soluble, remain undissolved when it is attempted to dissolve the product of the baking operation making it necessary to filter the solution before use, and discard or reprocess the insoluble materials. Also, as indicated above, the small amount of paratungstate remaining in solution may complicate the use of the solution because of its tendency to precipitate out with temperature changes or evaporation of the water.

U.S. Pat. No. 3,591,331 discloses a process for producing ammonium metatungstate without an appreciable formation of ammonium paratungstate. The process comprises contacting an aqueous ammonium tungstate solution having a pH of at least about 9 with an organic extractant solution comprising di-2-ehtylhexyl phosphoric acid, and a water insoluble hydrocarbon solvent, the components being in specified ratios to extract ammonium ions from the aqueous solution, separating the resultant aqueous solution from the organic solution, heating the aqueous solution to a temperature of at least about 60° C. for at least about 1 hour and recovering an essentially pure ammonium metatungstate.

U.S. Pat. No. 3,857,928 discloses a process for producing crystalline ammonium metatungstate from ammonium tungstate solution by introducing the ammonium tungstate solution into an ion exchange column containing a weak acid (carboxylic group) cation exchange resin, and collecting the effluent from the column until a pH of about 3.5 is reached. The effluent solution is then digested at about 98° C. for about 5 hours, followed by crystallization of ammonium metatungstate by conventional processes, such as, evaporation or spray drying.

U.S. Pat. No. 3,857,929 discloses a process for producing crystalline ammonium metatungstate from ammonium tungstate solution by introducing a strong acid cation exchange resin containing sulphonic group batchwise into an ammonium tungstate solution until a pH of about 3.5 is reached. The resin is then removed by filtration and the filtered solution is digested at about 98° C. for at least about 5 hours, followed by crystallization of ammonium metatungstate by conventional processes, such as, evaporation or spray drying.

U.S. Pat. No. 3,956,474 discloses a process for producing ammonium metatungstate from ammonium tungstate which involves the addition of about 3.6 percent by weight of silica to an ammonium tungstate solution, digestion for at least about 4 hours at a temperature of at least about 98° C. followed by filtration to remove silica from the ammonium metatungstate solution. Typically about 0.4 percent by weight of silica remains after filtering. The resulting ammonium metatungstate solution may be further processed to recover solid ammonium metatungstate, such as by evaporation or spray drying.

U.S. Pat. No. 3,936,362 discloses a process for producing ammonium metatungstate and other species by passing tungstate ions through an anion exchange membrane into an aqueous solution containing ammonium cations under the driving force of an electrical potential for a time sufficient to achieve a pH within the range in which the desired tungsten compound will form.

U.S. Pat. No. 3,175,881 discloses a method for producing crystalline ammonium metatungstate from ammonium paratungstate by heating the ammonium paratungstate to the point at which a slurry containing about 9% by weight of material exhibits a pH of from about 3 to about 5, the heating time being generally from about 4 to 8 hours, followed by evaporation of the slurry to about one-third of its original volume, filtering the concentrated slurry and then crystallizing ammonium metatungstate. Based on the $WO_3$ contents of the ammonium paratungstate starting material and the ammonium metatungstate produced, the yield is about 78.1%.

A more efficient method of producing crystalline ammonium metatungstate from ammonium paratungstate in higher yields than the above would be desirable.

SUMMARY OF THE INVENTION

In accordance with one aspect of this invention, there is provided a method of producing crystalline ammonium metatungstate from ammonium paratungstate. The method involves first heating the ammonium paratunstate in a multiple hearth furnace at from about 200° C. to about 400° C. to form a relatively uniformly heated ammonium paratungstate, followed by digestion of a water slurry of the heated ammonium paratungstate at from about 70° C. to about 100° C. for less than about 6 hours at relatively constant volume while maintaining the pH of the slurry at from about 35 to about 45 by the addition of ammonia as necessary to form a solution of ammonium metatungstate. The resulting ammonium metatungstate solution is then evaporated to a fraction of its original volume to concentrate it and the insolubles are removed. The ammonium metatungstate is then crystallized from the concentrated solution.

DETAILED DESCRIPTION OF THE INVENTION

For a better understanding of the present invention, together with other and further objects, advantages, and capabilities thereof, reference is made to the following disclosure and appended claims in connection with the foregoing description of some of the aspects of the invention.

By the process of this invention, crystalline ammonim metatungstate is produced from ammonium paratungstate in high yields.

Commercially available ammonium paratungstate which has the generally accepted formula $(NH_4)_{10}H_2W_{12}O_{41} \cdot x\ H_2O$ is first heated or calcined in a multiple hearth furnace to drive off ammonia and water vapor and form a relatively uniform heated ammonium paratungstate.

By the process described in U.S. Pat. No. 3,175,188, it was believed that ammonium metatungstate which has the formula $(NH_4)_6H_2W_{12}O_{40} \cdot H_2O$ could be produced by driving off the proper amount of ammonia and water which would be generally from about 5% to about 7%, the variation being due to the varying amounts of waters of hydration in the ammonium paratungstate. Therefore, the temperature and time of heating were designed to achieve weight losses in this range. However, the overall yield of ammonium metatungstate obtained by the process of this patent is only from about 75% to about 85%. It is now believed that the calcining conditions actually resulted in formation of insoluble material which ws one of the major causes of the relatively low yield. The insolubles can be (1) heteropoly compounds of tungsten which are tungsten compounds containing arsenic, phosphorus, or silicon, (2) ammonia deficient species as tungstic oxide which result form overcalcining and therefore excessive losses of ammonia, and/or presence of difficulty soluble ammonium paratungstate which results due to insufficient heating in the calcining operation. The latter two types especially can form as a result of uneven heating of the ammonium paratungstate which results in both overcalcining and undercalcining in the same batch. The calcining operation is generally carried out by heating the material in batches in trays or the material is continuously fed through a rotary type of kiln. The preferred method according to U.S. Pat. No. 3,175,881 is in a continuous rotary calciner.

The present invention discloses use of a multiple hearth furnace to uniformly heat the ammonium paratungstate in order to prevent formation of excessive insolubles which result from overheating or underheating. The result is an increase in the overall yield of ammonium metatungstate.

A multiple hearth furnace which can be used in the operation of this invention, is a plate dryer which is a continuously operating contact dryer suitable for handling free-flowing, non caking, trickling, powdery, or granular products. It consists of a number of drying plates placed one above the other and spaced apart. Its specific characteristics are the mechanical product conveying and the low velocity of purging gases and/or vapors which avoids excessive dust formation and permits the handling of very fine products and those with a wide particle distribution. Plate dryers manufactured by Krauss Maffei are especially suitable. In general, the plate dryer operates by allowing the moist product to trickle from a feed mechanism such as a bucket wheel, etc. onto the top plate. The rotating raking system which consists of rakes positioned on each plate, conveys the drying product in a spiralic pattern through several revolutions to and over the outer rim of the first plate. Here the product trickles to the next plate below, where it is conveyed to the center of the plate in the same manner as before. The transportation operation repeats itself according to the number of plates. During its contact with the heated plate surface, the product is drying. The vapors are exhausted or discharged by purging gases (air or inert gas) flowing transversely across the plates. Each plate can be heated individually, thus allowing a tempature profile exactly suited to the product and process. Heating media are steam, hot water, or heat transfer fluids.

Another type of multiple hearth furnace is the Turbo Dryer in particular, one manufactured by Wyssmont, of Fort Lee, N.J. The Turbo Dryer has only two moving parts: the tray/shelf assembly and the fan assembly. Wet feed enters the dryer through a feed chute in the roof of the housing and flows onto the first shelf. The shelves are circular with cut out center and radial slots. The shelves are rigidly mounted on an inner supporting frame forming a vertical stack which rotates slowly as a unit. Material flows onto each shelf from the one above, forming a pile. The rotation of the tray/shelf assembly carries the freshly formed pile past a stationary blade set to level the pile to fill the tray at a uniform height. At the end of a revolution, the tray segment meets a second stationary blade set to wipe the tray clean of material. The material is held stationary by the wiper blade while the tray continues its rotation. The material flows through the radial slot on to the shelf below where the cycle is repeated. Material progresses downward from shelf to shelf through the dryer and is discharged through a chute in the housing bottom. Air or other drying medium is fed to the dryer through a side mounted vertical manifold with control dampers. Air movement inside the dryer is provided by centrifugal fans mounted on a single vertical shaft. The fan assembly fits in the center of the shelf assembly and rotates independently of the shelves. The drying medium leaves the dryer through a roof exhaust.

While very specific multi hearth furnaces have been just described, it is to be understood that any mulitple hearth or stage type of furnace or dryer can be used to accomplish uniform heating of the ammonium paratungstate.

The heating conditions as temperature, residence time, bed depth, number of stages or hearths, etc., can vary depending on the particular furnace or dryer being used. However, in general heating temperatures are from about 200° C. to about 400° C. with from about 260° C. to about 370° C. being preferred. The material bed depth is maintained generally from about ½ inches to about 2½ inches with from about ¾ inches to about ⅛ inches being preferred. The bed of material is gently, and continuously agitated. The flow of heated air through the furnace is closely regulated to from about ¾ to about 2 cubic feet of air per pound of ammonium paratungstate. The residence time, of course varies with the above conditions. The heating conditions are designed to give a weight loss of from about 5.5% to about 7.5%. In this range of weight loss, there are less ammonia deficient species formed and therefore less insolubles.

A slurry is then formed of the heated ammonium paratungstate in water, preferably deionized water, with generally from about 20 to about 40 parts of ammonium paratungstate in from about 80 to about 60 parts of the water. Although the method can be carried out with larger proportions of water, obvious inefficiencies are introduced because of the necessity for evaporating excess water. Slightly smaller quantities of water can also be used but the subsequent digestion step may then not adequately convert any residual paratungstate to the metatungstate, the result being lower yields or contaminated product. Preferably the water is preheated to from about 60° C. to about 80° before the calcined material is added to it.

Prior to the use of the multiple hearth furnace in the heating of the ammonium paratungstate, it was critical that the material be digested at temperature for preferably about 6 hours to insure essentially complete conversion to the metatungstate structure. Shorter digestion times result in less efficient conversion. By the method of this invention, by uniformly heating the starting ammonium paratungstate which is accomplished by the multiple hearth furnace and with the desired weight loss of from about 5.5% to about 7.5%, the minimum 6 hour digestion time is no longer needed and essentially complete conversion to ammonium metaungstate can be accomplished in less time, such that the heated ammonium paratungstate is now according to this invention digested for less than about 6 hours, preferably about 4 hours at from about 70° C. to about 100° C., preferably from about 90° C. to about 100° C. For proper conversion to ammonium metatungstate it is also critical that the pH range be maintained at from about 4.2 to about 3.0. During the digestion process there can be some loss of ammonia, resulting in a drop in pH. Therefore, ammonia or ammonium hydroxide (aqueous ammonia) can be added to maintain the pH in the proper range. As a result of the digestion a solution of ammonium metatungstate in water is formed. There can also be some insoluble material present due to impurities, or some tungstic oxide, but this amount is very small.

The solution is then evaporated to a fraction, preferably about one-third of its original volume to concentrate the ammonium metatungstate. An open kettle is suitable for this purpose.

Any insoluble material is then separated from the concentrated ammonium metatungstate solution by any standard technique such as filtration.

Crystalline ammonium metatungstate can then be recovered from the concentrated solution by any conventional manner such as by evaporation or by spray drying.

Based on the $WC_3$ content of the starting ammonium paratungstate and the ammonium metatungstate produced, the yield is at least about 95%.

To more fully illustrate this invention, the followng non-limiting example is presented. All parts, portions, and percentages are on a weight basis unless otherwise stated. Commercially available ammonium paratungstate is roasted in a multiple hearth furnace at from about 200° C. to about 400° C. The material is continuously fed and discharged from the furnace. Within the furnace, the bed depth is maintained at from about ½ inch to about 1½ inches and the bed of material is gently but continuously agitated. The flow of heated aid through the furnace is closely regulated to from about ¾ to about 2 cubic feet of air per pound of feed material. The weight loss of the material is from about 5.5 to about 7.5%. About 50 parts of the heated ammonium paratungstate is slurried in about 300 parts of deionized water at from about 76° C. to about 80° C. with agitation for from about 3 to about 6 hours. During the digestion the pH of the slurry is maintained at from about 3.6 to about 4.0 by the addition of ammonium hydroxide. The volume of the slurry is then reduced to about one third its original volume. The insolubles are filtered off, and ammonium metatungstate is crystallized from the concentrated solution.

While there has been shown and described what are at present considered the preferred embodiments of the invention, it will be obvious to those skilled in the art that various changes and modifications may be made therein without departing from the scope of the invention, as defined by the appended claims.

What is claimed is:

1. A method of producing crystalline ammonium metatungstate from ammonium paratungstate, said method comprising:
    (a) heating said ammonium paratungstate in a multiple hearth furnace at from about 200° C. to about 400° C. to form a relatively uniformly heated ammonium paratungstate;
    (b) forming a slurry of said heated ammonium paratungstate and water;
    (c) digesting said slurry at from about 70° C. to about 100° C. for less than about 6 hours at relatively constant volume while maintaining the pH of said slurry at from about 4.2 to about 3.0 by the addition of ammonia as necessary to form a solution of ammonium metatungstate in water,
    (d) evaporating said solution to a fraction of its original volume to form a relatively concentrated ammonium metatungstate solution;
    (e) separating any insoluble material from said concentrated ammonium metatungstate solution; and
    (f) crystallizing ammonium metatungstate from said concentrated ammonium metatungstate solution.

2. A method according to claim 1 wherein the digestion time is about 4 hours.

3. A method according to claim 1 wherein at least 95% by weight of tungsten in said ammonium paratungstate is converted to ammonium metatungstate.

* * * * *